United States Patent [19]

Sommer

[11] Patent Number: 4,616,739
[45] Date of Patent: * Oct. 14, 1986

[54] INCHING DRIVE

[75] Inventor: Gordon M. Sommer, Boca Raton, Fla.

[73] Assignee: Sommer Co., Warren, Mich.

[ * ] Notice: The portion of the term of this patent subsequent to Jan. 22, 2002 has been disclaimed.

[21] Appl. No.: 521,243

[22] Filed: Aug. 3, 1983

Related U.S. Application Data

[63] Continuation-in-part of Ser. No. 403,300, Jul. 30, 1982, Pat. No. 4,494,635.

[51] Int. Cl.⁴ .............................................. F16D 67/04
[52] U.S. Cl. ................. 192/18 A; 192/12 C; 74/665 C
[58] Field of Search ............. 192/0.02 R, 0.098, 12 C, 192/18 A, 18 R, 48.3, 48.8, 58 C, 67 R, 85 A; 74/411.5, 606 R, 665 C, 665 H, 665 A; 70/185, 186

[56] References Cited

U.S. PATENT DOCUMENTS

| | | | |
|---|---|---|---|
| 2,931,424 | 4/1960 | Pickles | 192/67 R X |
| 3,273,415 | 9/1966 | Frost | 192/48.8 X |
| 3,460,656 | 8/1969 | Swanson | 192/87.13 X |
| 3,610,004 | 10/1971 | Neese | 70/186 X |
| 3,696,898 | 10/1972 | Sommer | 192/58 C X |
| 4,125,178 | 11/1978 | Monks | 192/12 C X |
| 4,464,947 | 8/1984 | Windsor-Smith et al. | 192/48.8 X |
| 4,494,635 | 1/1985 | Sommer | 192/12 C |

*Primary Examiner*—Rodney H. Bonck
*Assistant Examiner*—Richard M. Lorence
*Attorney, Agent, or Firm*—Harness, Dickey & Pierce

[57] ABSTRACT

An inching drive unit for a brake unit, clutch/brake unit, or the like, the unit having a housing and a main rotatable member operably associated with a first portion of the housing, the inching drive unit comprising an inching motor having a drive shaft, a second portion of the housing secured to the inching motor into which the inching motor drive shaft extends, a first gear mechanism disposed at least in part within the inching drive portion of the housing and operably associated with the inching motor drive shaft, a second rotatable member mechanism operably associated with the main rotatable member, and a mechanism for selectively engaging the first gear mechanism with the second rotatable member mechanism wherein engagement of the first gear mechanism with the second rotatable member mechanism permits the inching motor to drive the input shaft of the clutch/brake unit.

7 Claims, 3 Drawing Figures

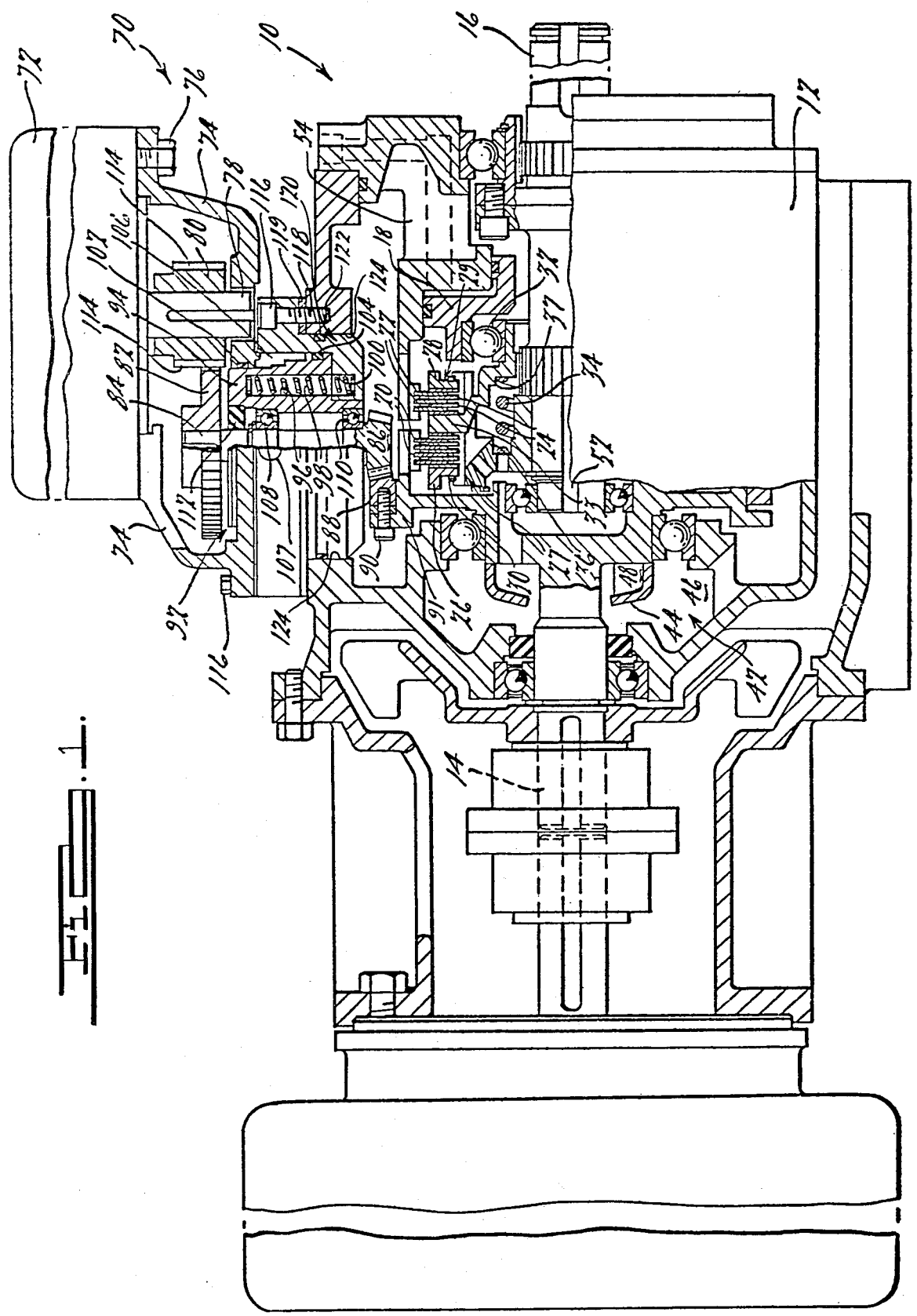

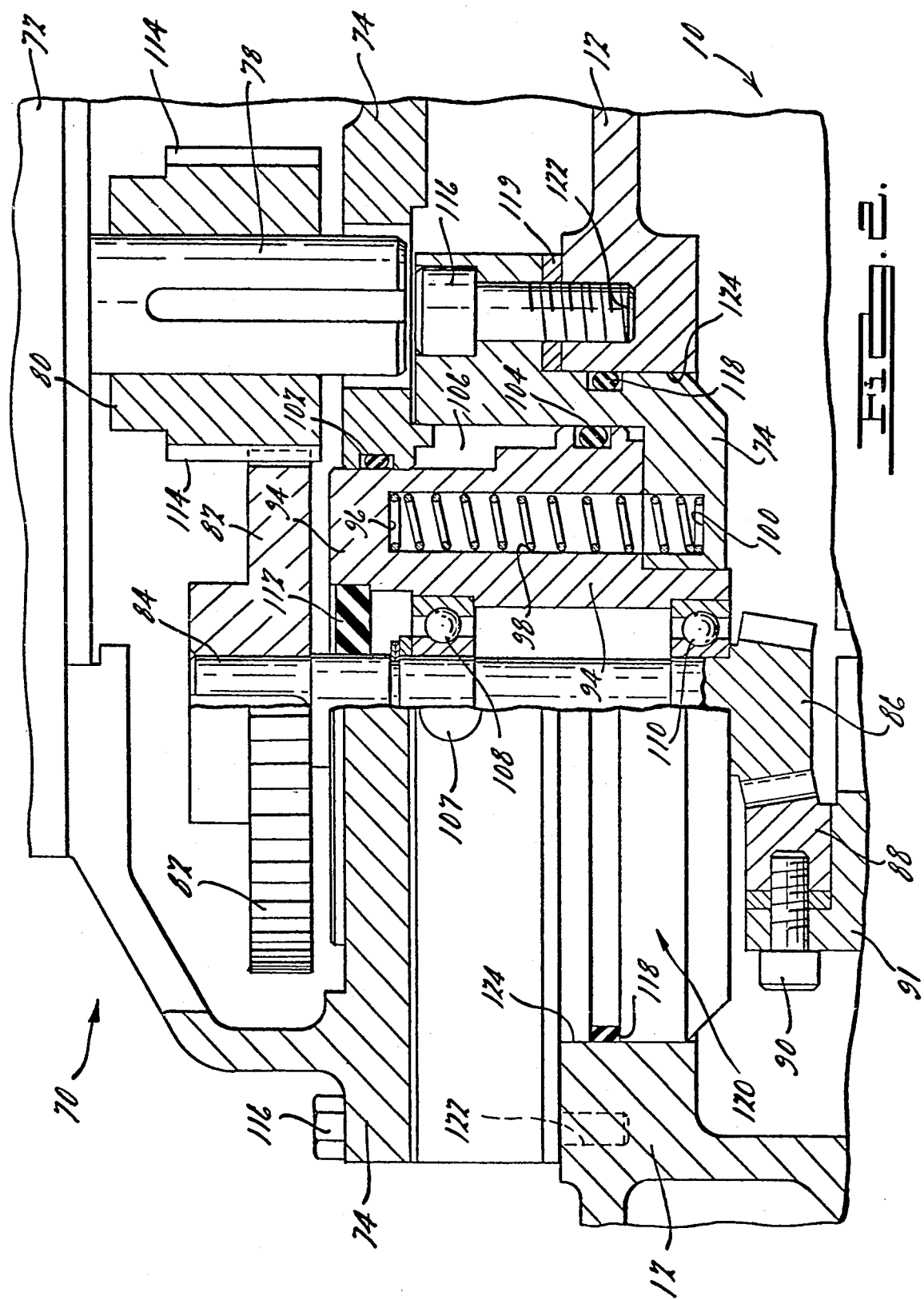

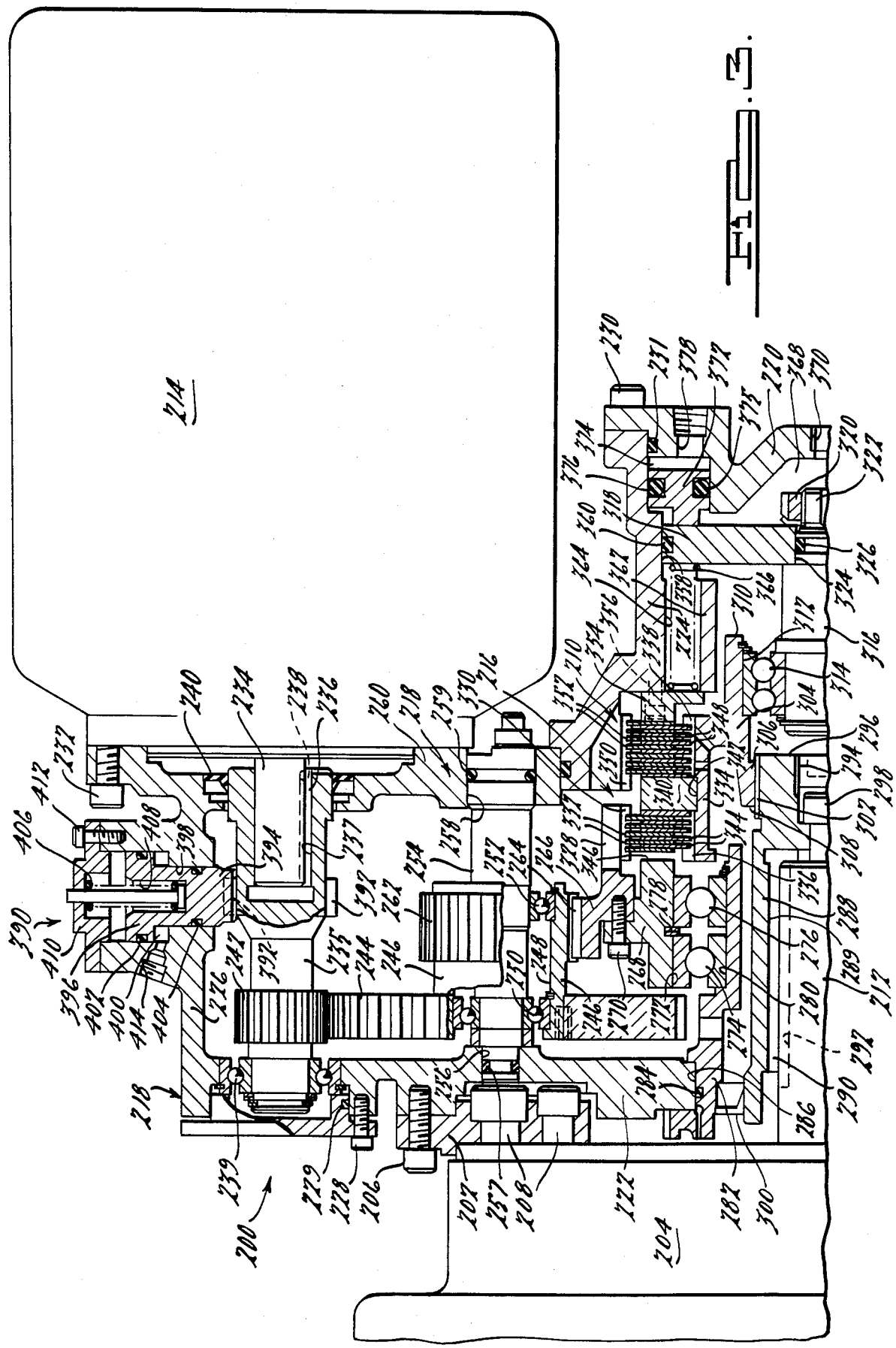

INCHING DRIVE

CROSS-REFERENCE TO RELATED APPLICATION

This application is a continuation-in-part of Ser. No. 403,300, filed July 30, 1982 now U.S. Pat. No. 4,494,635, issued Jan. 22, 1985.

BACKGROUND AND SUMMARY OF THE INVENTION

The present invention relates generally to a brake unit, a clutch unit or clutch/brake unit combined with an inching drive and, more particularly, to an integrated inching drive for an oil submerged brake unit or clutch/brake unit.

Clutch/brake units and brake units have several applications to which they can be applied. One application involves inching of the output shaft of the unit, such as in setting a male die versus a female die, feeding of sheet metal stock or paper, or use of any type of conveyor, turntable or other automation equipment where indexing may be used. Another application may be to provide progressive die pressing or punching operations. For the clutch/brake unit or brake unit to be applied to these various additional applications which are presently not applicable to clutch/brake units or brake units of the type described, a separate inching motor must be secured as a replacement on the input shaft of the clutch/brake unit externally of the unit to replace whatever drive motor is normally attached to that input shaft or physically replace the main motor and brake unit with an inching drive and brake unit.

Accordingly, it is one object of the present invention to expand the capability of the submerged clutch/brake unit or brake unit to various inching operations with an integrated yet removable inching drive unit. In furtherance of this object, a modular inching drive unit is presented herein which permits the option of inching to be used or not used as desired, without inhibiting the various other applications to which the clutch/brake unit or brake unit may be applied.

Another object of the present invention is to provide an inching drive which need not be removed from the clutch/brake unit or brake unit when not used, yet will not affect any other function performed by the clutch/brake unit or the brake unit. Accordingly, control mechanism is included with the indexing drive having a clutch actuation mechanism which is activated whenever inching movement is desired. This actuation mechanism is pneumatically-controlled and the clutch mechanism for the actuation mechanism is submerged in oil. The inching drive mechanism is readily incorporated into a clutch/brake unit with minimal modification of the basic unit, and may be completely removed from the clutch/brake unit without affecting the basic operation of the unit.

Further objects of the present invention are to provide a new and improved inching drive for a clutch/brake unit or a brake unit of the character described which is simple and compact in design, economical to produce and operate, extremely rugged and maintenance-free during operation, and adaptable to be selectively employed in a variety of types of automation equipment settings where indexing or inching is desirable.

Other objects and advantages of the present invention will become apparent in the following detailed description taken in conjunction with the accompanying drawings.

BRIEF DESCRIPTION OF THE DRAWINGS

FIG. 1 is a longitudinal side sectional view partially in elevation of a clutch/brake unit having an inching drive of the present invention mounted thereon;

FIG. 2 is an enlarged side sectional view of a portion of the inching drive unit; and FIG. 3 is a longitudinal side section view partially in elevation of a brake unit having an inching drive of the present invention mounted thereon.

DETAILED DESCRIPTION OF THE PREFERRED EMBODIMENTS

Referring to FIG. 1, a clutch/brake unit 10 is illustrated similar to that described in applicant's U.S. Pat. No. 3,696,898, issued Oct. 10, 1972. The clutch/brake unit 10 is comprised of a housing 12, axially aligned input shaft 14 and output shaft 16 mounted in the housing 12, a non-rotatable pneumatically actuated piston 18 in the housing 12, a series of radially disposed clutch plates 20 mounted for rotation with the input shaft 14, a series of radially disposed brake plates 22 spaced axially from the clutch plates 20 and non-rotatably attached to the housing 12, a series of friction discs 24 mounted on the output shaft 16 for rotation therewith and adapted for selective frictional engagement with the clutch 20 and brake plates 22, a fixed clutch actuating member 26 and a fixed brake actuating member 28 carried on the output shaft 16 adjacent the clutch 20 and brake plates 22, securement bolts 30 extending between the last two members 26 and 28, whereby the members 26 and 28 are movable together axially of the output shaft 16, and a bearing 32 disposed between the piston 18 and the movable primary clutch and brake actuating member 33 through which the piston 18 drives the movable actuating member 33 against the fixed clutch 26 or fixed brake 28 actuating members and thereby actuating the clutch 27 or brake 29. Movement of the piston 18 in one direction serves to simultaneously frictionally engage the clutch plates 20 with certain of the friction discs 24 and to release the remaining friction discs 24 from frictional engagement with the brake plates 22 (clutch actuation), and movement of the piston 18 in the other direction serves to simultaneously release the clutch plates 20 from the frictional engagement with certain friction discs 24 and to frictionally engage the remaining friction discs 24 with the brake plates 22 (brake actuation). Springs 34 are mounted between recesses 36 at one end of the output shaft 16 and recesses 37 in the member 33 to normally urge the member 33 toward a position wherein the springs 34 effect engagement of the brake 29 and release the clutch 27. A pumping mechanism 42 is disposed on the input shaft 14 having a centrifugal pump 44 rotatable with the shaft 14 in an annular chamber 46. The pump 44 has vanes 48 at the outer periphery thereof to direct the fluid into an oil cooler (not shown) or the oil delivery system of the clutch/brake unit 10, such as passageways 52, 54.

An inching drive mechanism 70 is mounted to the housing 12. The inching drive mechanism 70 comprises an inching motor 72 and housing 74 which are mounted together by bolts 76. The motor 72 has an output shaft 78 extending into the housing 74 upon which is mounted a first pinion drive gear 80. The gear 80 meshes with a second drive gear 82 mounted on a shaft 84 disposed parallel to the output shaft 78 of the motor 72 and perpendicular to the input 14 and output 16 shafts of the clutch/brake unit 10. The opposite end of the shaft 84 has a beveled pinion gear 86 secured thereto which is engageable with an annular rack gear 88 secured by a plurality of bolts 90 to a radially outwardly extended portion 91 of the input shaft 14 of the clutch/brake unit 10.

Also disposed within the housing 74 is an actuation mechanism 92 for the inching mechanism 70 which comprises an annular piston 94 having a series of recesses 96 in which are disposed one end of a plurality of springs 98, the other end of which springs 98 are disposed in recesses 100 within the housing 74. The housing 74, annular piston 94, and upper 102 and lower 104 seals form an air chamber 106. The annular air chamber 106 is fed pneumatically via port 107 to dispose the annular piston 94 in a downward direction from its pre-actuation position as pre-loaded by the springs 98.

The drive shaft 84 is connected to the annular piston 94 by means of two roller bearings 108, 110 and a seal 112 which maintains the chamber formed by the housing 74 separate from the chamber formed by the housing 12 on the clutch/brake unit 10.

In operation, the piston 94 is set in its normal position vertically upwardly disposed by the preload of the springs 98. Thus, the beveled pinion gear 86 is disposed upwardly out of contact with the annular beveled rack gear 88. Upon pneumatic actuation, the piston 94 is driven vertically downwardly to bring the pinion gear 86 into contact with the beveled rack gear 88. The drive gear 82 is always in contact with the pinion drive gear 80 and slides along the splines 114 thereof. The inching motor 72 is actuated to drive the input shaft 14 of the clutch/brake unit 10 via the extended portion 91, and the clutch 27 of the clutch/brake unit 10 is actuated so that the input shaft 14 drives the output shaft 16 of the clutch/brake unit 10 and thereby any accessory mounted to that output shaft 16. Actuation of the brake 29 will stop the output shaft 16, after disengaging the clutch 27, and thereby stop powering any accessory driven by the shaft 16.

The inching drive 70 is secured to the clutch/brake unit 10 by a plurality of bolts 116 between housing 74 and housing 12 of the unit 10. An appropriate seal 118 and gasket 119 are also disposed between the housings 12 and 74. If the inching drive need to be removed for repair, replacement or otherwise, a cap (not shown) may be placed over the housing 12 of the unit 10 and the unit may continue to operate its other functions without inhibition by removal of the inching drive 70. The inching drive 70 may be added to the clutch/brake unit 10 at any time in the lifetime of the unit 10 as long as the mounting station 120 (with mounting locations 122 and access opening 124) and rack gear 88 exist on the unit 10.

Referring to FIG. 3, an alternative form of the invention is illustrated. A brake unit 200 is shown secured to the frame 202 of a main motor 204 by a plurality of circumferentially spaced bolts 206. The frame 202 is secured to the motor 204 similarly by a plurality of circumferentially spaced bolts 208.

The brake unit 200 comprises a brake 210 for the main shaft 212 of the main motor 204, an inching motor 214, and a clutch 216 for engaging the inching motor with the main shaft 212 of the main motor 204 to drive a machine (not shown) via the main shaft 212. The brake 210 and clutch 216 are enclosed by an oil-filled housing 218, comprised of two end walls 220 and 222, an annular housing section 224, and an intermediate gear housing 226. The gear housing 226 is secured to end wall 222 by a plurality of circumferentially spaced bolts 228 and suitable oil seals 229. The annular housing section 224 is secured to the end wall 222 at its lower periphery (not shown) by suitable bolt fasteners and is secured to the gear housing 226 at the upper peripheral interface of the housing section 224. The opposite end of the annular section 224 is secured to end wall 220 by a plurality of circumferentially spaced bolts 230 and suitable oil seals 231.

An inching motor 214 is secured to bolts 232 to the gear housing 226 with the drive shaft 234 of the motor 214 extending into the housing 226. The drive shaft 234 telescopically engages an interior drive shaft 235 via a spline 236 on the internal bore 237 of the interior shaft 235 and a keyway 238 on the drive shaft 234. The interior shaft 235 is rotatably mounted within the housing 218 by bearing 239 and appropriately sealed at one end by a seal 240. A pinion gear 242 is disposed on the interior shaft 235 and is rotatable with that shaft 235. The pinion gear 242 meshes with a first gear 244 which is mounted on a sleeve 246 wherein the pinion gear 242 rotatably drives the sleeve 246 via the gear 244. The sleeve 246 has an internal bore 248 within which two bearings 250 and 252 are disposed. A nonrotating support shaft 254 extends from a bore 256 having a suitable seal 257 in the end wall 222 through the bearings 250 and 252 into a bore 258, also having a seal 259, in an oppositely disposed end wall 260 of the gear housing 226 to support the sleeve 246.

Sleeve 246 has a second gear 262 fixedly disposed at the outer periphery thereof, rotatable with the sleeve 246, axially spaced from the first gear 244, and generally having a different (smaller) diameter than the first gear 244. This second gear 262 meshingly engages the teeth 264 of a first annular member 266. The first annular member 266 is secured to a second annular member 268 by a plurality of circumferentially spaced bolts 270. The second annular member 268 has an interior bore 272 within which is disposed a pair of bearings 274 and 276 separated by a snap ring 278. The bearings 274 and 276 are mounted in an annular recess 280 around the outer periphery of an axially extending stationary annular sleeve 282 affixed to the inner periphery of end wall 222 with a suitable seal 284 at the interface of the wall 222 and the sleeve 282, comprising an annular groove 286 within which the wall 222 is inserted. Either the wall 222 or the sleeve 282 are comprised of multiple pieces to facilitate assembly.

A cylinder power transmitting member 288 disposed within the sleeve 282 encapsulates and is connected to the main shaft 212 within the bore 289 of the member 288. The member 288 has a spline 290 which is inserted within a keyway 292 in the shaft 212 and also has a bore 294 at one end 296 thereof through which a bolt 298 is threadably associated with the shaft 212. A suitable seal 300 is disposed between the sleeve 282 and the cylindrical member 288.

The external periphery of the cylindrical member 288 includes a series of splines forming a gear 302. An annular first power transmitting member 304 is disposed around the gear 302 and includes teeth 306 along one end 308 of its inner periphery that mesh with the splines of gear 302. The other end 310 of the inner periphery of the member 304 includes a recess 312 within which a bearing 314 is disposed. The bearing 314 is mounted on a stub shaft 316 secured to a piston head 318 by means of a nut 320 threadably secured to an extended threaded portion 322 of the shaft 316 disposed through a bore 324 in the piston head 318 along with a suitable seal 326.

The clutch 216 includes an extended annular portion 328 integral with the first annular member 266, which extended portion has a plurality of longitudinally extending drive lugs 330 disposed at circumferentially spaced locations along the inner periphery thereof. A series of friction clutch plate members, generally designated 332, are each provided with a plurality of circumferentially spaced, radially inwardly extending notches adapted for keyed engagement with the drive lugs 330.

The annular first power transmitting member 304 includes an annular extended portion 334 having two sets 336 and 338 of longitudinally extending, circumferentially spaced spline formations disposed one set at the radially outer periphery thereof and disposed on each side of a snap ring 340 positioned in a groove 342 of the extended portion 334. A series of friction clutch disc members, generally designated 344, are provided with internal notches complementary to the formations 336 and adapted for splined engagement with those formations 336. In assembly, the clutch plates 332 and discs 344 are interleaved between the snap ring 340 and an abutment surface 346 of the second annular member 268 to be capable of engagement and disengagement via oil shear upon proper movement of the first power transmitting member 304 as will be discussed below.

The brake 210 includes a series of friction brake disc members, generally designated 348, which are provided with internal notches complementary to the second set of formations 338 and adapted for splined engagement with those formations 338.

Annular housing section 224 includes a series of longitudinally extending, circumferentially spaced lugs 350. A series of friction brake plate members, generally designated 532, are each provided with a plurality of circumferentially spaced, radially inwardly extending notches adapted for keyed engagement with the lugs 350. In assembly, the brake discs 348 and plates 352 are interleaved between the snap ring 340 and an annular brake abutment 354 affixed to the housing wall 224 by suitable bolts 356 so that the discs 348 and plates 352 are capable of engagement and disengagement via oil shear again proper movement of the first power transmitting member 304 as will be discussed below.

The piston head 318 moves along the inner peripheral surface 358 of housing wall 224 with a suitable seal 360 between the piston head 318 and the inner surface 358. The housing wall 224 includes a radially inwardly extending flange 362 through which a series of bores 364 are disposed and closed at one end by abutment 354. Compression springs 366 are positioned in the bores 364 and act in assembly against both the abutment 354 and the piston head 318 to bias the piston head 318.

A first air chamber 368 is formed by piston head 318, housing side wall 224, and housing end wall 220. An air port 370 is disposed in end wall 220 to communicate a source of pressurized air with the chamber 368.

A second annular piston 372 acts against the first piston 318 and moves in a chamber 374 formed by the piston 372, housing side wall 224, and housing end wall 220. Suitable seals 375 and 376 are disposed at the inner and outer peripheries, respectively, of the piston 372. A second port 378 is disposed in end wall 220 to communicate a source of pressurized air with the chamber 374.

In operation, a person may select one of the two types of drive motors or brake the device. The unit 200 is biased into a braking position by the springs 366 against the first piston head 318 which moves to the right in FIG. 3 to force the first power transmitting member 304 to the right to interact the brake discs 348 and plates 352 via oil shear to brake the rotating member 304 and thereby the shaft 212. If the main drive motor 204 is to be used, pressurized air is supplied to second piston chamber 374 via port 378, which forces the second piston 372 against the first piston head 318 to overcome to bias of the springs 366 and release the brake 210.

A sufficient gap exists between the abutment surface 346 and the snap ring 340 whereby release of the brake 210 by piston 372 does not engage the clutch 216. Once the main motor 204 is stopped, the inching drive 214 may be used by supplying pressurized air to the first chamber 368 via port 370 to both disengage the brake 210 and also engage the clutch 216 so that the inching drive motor 214 drives a device through the shaft 212 of the main motor. Thus, different types of drives may be used without manual disconnection of the motor from the driven device.

A pneumatically released safety 390 is also provided so that the inching drive motor 214 does not interfere with the desired operations when not intended to be used. The interior shaft 235 includes lugs 392 on the outer periphery thereof which engage one end 394 of a piston 396. The piston 396 is disposed in a cylindrical bore 398 in gear box wall 226. A chamber 400 is formed by the bore 398, the piston 396, and upper 402 and lower 404 annular seals between the piston 396 and the bore 398. The piston 396 is biased into engagement with the shaft 235 by a spring 406 disposed within an internal bore 408 of the piston 396 and abutting against a cap 410 affixed to the wall 226 by suitable bolts 412. A port 414 selectively communicates pressurized air to the chamber 400 to release the safety 390. Of course, the supply of pressurized air to the safety chamber 400 may be coordinated with supply of air to the first piston chamber 368 for maximum utility of the safety.

Any of a number of known devices can be used for selection of supply of pressurized air to the various ports 370, 378 and 414 and need not be discussed here.

While it will be apparent that the preferred embodiments as illustrated herein are well calculated to fulfill the objects above stated, it will also be appreciated that the present invention is susceptible to modification, variation and change without departing from the proper scope or fair meaning of the subjoined claims.

I claim:

1. An inching drive unit for an apparatus having a main housing, a main shaft operably associated with said main housing, and means disposed within said main housing for braking said main shaft, said inching drive unit comprising:
   inching motor means for driving said inching drive unit, having a drive shaft extending therefrom;
   a second housing secured to said inching motor means, said drive shaft of said inching motor means extending into said second housing;
   first gear means disposed at least in part within said second housing and operably associated with said inching motor drive shaft; and
   axially fixed second gear means operably associated with said main shaft of said apparatus via clutch means for engagement and disengagement of said main shaft with said second gear means, wherein said inching drive unit drives said main shaft through said second gear means and said clutch means;

said first gear means being engageable with said second gear means wherein said first gear means drives said second gear means do permit said inching motor means to drive said main shaft of said apparatus via engagement of said clutch means.

2. An inching drive unit for an apparatus having a housing, and a main rotatable member operably associated with said housing, said housing having a first portion having an interior portion, said inching drive unit comprising:

inching motor means for driving said inching drive unit, having a drive shaft extending therefrom;

a second portion of said housing secured to said inching motor means, said drive shaft of said inching motor means extending into said second portion of said housing;

first gear means disposed within said second portion of said housing and fixedly secured to said inching motor drive shaft;

a second member rotatably disposed within said second portion of said housing and extending into said first portion of said housing;

second gear means disposed within said second portion of said housing on said second member and operably engageable with said first gear means to be driven by said first gear means and thereby drive said second member;

third gear means also disposed on said second member spaced apart from said second gear means and disposed within said first portion of said housing;

fourth gear means operably associated with said main rotatable member of said apparatus; and means for selectively engaging said third gear means with said fourth gear means wherein engagement of said third gear means with said fourth gear means permits said inching motor means to drive said main rotatable member of said apparatus.

3. An inching drive unit in accordance with claim 2, wherein said means for selectively engaging comprises:

a pneumatic chamber within one of said first or second portions of said housing; and annular piston means operably associated with said pneumatic chamber;

wherein movement of said piston means in a first direction engages said third gear means with said fourth gear means, and movement of said piston means in a second direction spaces apart said third gear means from said fourth gear means, said piston means being movable in response to the pressure of air in said pneumatic chamber.

4. An inching drive unit in accordance with claim 2, wherein said main rotatable member and said second member have parallel axes of rotation.

5. An inching drive unit in accordance with claim 2, further comprising first engaging means disposed in association with said inching drive shaft within said second portion of said housing, second means disposed in said housing for engaging said first engagement means to hold said inching drive shaft in a nonrotatable position, and means for controlling the selected engagement of said first and second engaging means.

6. An inching drive unit in accordance with claim 5, wherein said first engaging means comprises at least one radially extending lug and second engaging means comprises means for engaging said lug to hold said shaft against rotation.

7. An inching drive unit in accordance with claim 6, wherein said second engaging means further comprises piston means for disposing said lug engaging means into engagement with said lug and releasing said lug engaging means from engagement with said lug, said housing including a chamber within which said piston moves, and said second engaging means including means for selectively driving said piston means.

* * * * *